US011671570B2

(12) United States Patent
Zhou et al.

(10) Patent No.: US 11,671,570 B2
(45) Date of Patent: Jun. 6, 2023

(54) METHOD AND APPARATUS FOR ADJUSTING PROJECTION PICTURE, AND PROJECTION DEVICE

(71) Applicant: IVIEW DISPLAYS (SHENZHEN) COMPANY LTD., Shenzhen (CN)

(72) Inventors: Yu Zhou, Shenzhen (CN); Mingnei Ding, Shenzhen (CN); Steve Yeung, Hong Kong (CN); Zhiqiang Gao, Hong Kong (CN)

(73) Assignee: IVIEW DISPLAYS (SHENZHEN) COMPANY LTD., Shenzhen (CN)

( * ) Notice: Subject to any disclaimer, the term of this patent is extended or adjusted under 35 U.S.C. 154(b) by 27 days.

(21) Appl. No.: 17/544,245

(22) Filed: Dec. 7, 2021

(65) Prior Publication Data
US 2022/0094894 A1 Mar. 24, 2022

Related U.S. Application Data

(63) Continuation of application No. PCT/CN2020/125922, filed on Nov. 2, 2020.

(30) Foreign Application Priority Data

Aug. 27, 2020 (CN) .......................... 202010878765.0

(51) Int. Cl.
*H04N 9/31* (2006.01)
(52) U.S. Cl.
CPC ......... *H04N 9/3185* (2013.01); *H04N 9/3176* (2013.01)

(58) Field of Classification Search
CPC ...... H04N 9/43; H04N 9/3147; H04N 9/3176; H04N 9/3182; H04N 9/3185;
(Continued)

(56) References Cited

U.S. PATENT DOCUMENTS

| 6,727,864 B1 * | 4/2004 | Johnson ................. | G03B 37/04 345/1.3 |
| 2003/0053033 A1 * | 3/2003 | Vrachan ................. | G02B 30/56 353/31 |

(Continued)

FOREIGN PATENT DOCUMENTS

| CN | 108398845 A | 8/2018 |
| CN | 105262968 A | 10/2018 |

(Continued)

*Primary Examiner* — Sultan Chowdhury
(74) *Attorney, Agent, or Firm* — IPro, PLLC

(57) ABSTRACT

A method for adjusting a projection picture includes: receiving a first image, captured by a first imaging module, of a position where the projection picture is located, and a second image, captured by a second imaging module, of surroundings of a projection device; identifying, based on the first image, whether a projection shade is present within a projection range of a projecting module; identifying position information of a projection shade in response to the projection shade being present; identifying, based on the second image, movable directions and movable distances of the projection device; and controlling, based on the position information of the projection shade and the movable directions of the projection device and the movable distances in the movable directions, the position adjusting module to adjust the projection device, such that the projection device escapes from the projection shade and a complete projection picture is acquired.

15 Claims, 10 Drawing Sheets

(58) Field of Classification Search
CPC ...... H04N 9/3194; G03B 21/13; G03B 21/14; G03B 21/36; G03B 21/40; G03B 21/145; G03B 21/147; G03B 21/2053
See application file for complete search history.

(56) References Cited

U.S. PATENT DOCUMENTS

2008/0278577 A1* 11/2008 Otsuka ................. H04N 23/741
348/113
2015/0302549 A1 10/2015 Hiroi et al.

FOREIGN PATENT DOCUMENTS

| CN | 109391805 A | 2/2019 |
|----|-------------|--------|
| CN | 111031298 A | 12/2021 |

* cited by examiner

METHOD AND APPARATUS FOR ADJUSTING PROJECTION PICTURE, AND PROJECTION DEVICE

CROSS-REFERENCE TO RELATED APPLICATION

This application is based upon and claims priority to Chinese Patent Application No. 202010878765.0, filed to China National Intellectual Property Administration on Aug. 27, 2020 and entitled "METHOD AND APPARATUS FOR ADJUSTING PROJECTION PICTURE, AND PROJECTION DEVICE", the entire contents of which are incorporated herein by reference.

TECHNICAL FIELD

Embodiments of the present disclosure relate to the technical field of projection, and in particular, relate to a method and apparatus for adjusting a projection picture, and a projection device.

BACKGROUND

A projection device is an optical instrument which magnifies, by using an optical element, an object to be projected, such as an image or a video, and projects the magnified object to be projected onto a screen. Some projection devices may be connected to a computer, a VCD, a BD, a game machine, a VD, and the like via different interfaces to play corresponding video signals. Some other projection devices may be connected to a WiPlugWiPlug, then a computer, a mobile phone, or a pad is connected to the WiPlug within a same Wi-Fi network, and finally content of the computer, the mobile phone or the pad may be synchronously displayed on the screen of the projection device. With the rapid development of the projection technologies, office projection devices are being continuously designed and manufactured, and people are imposing higher and higher requirements on artificial intelligence products in terms of user experience.

However, during practice of the present disclosure, the inventors have found that: the projection devices at the market are mostly fixedly placed, and when a projection shade is present within a projection range of the projection device, the placement position of the projection device needs to be manually readjusted, and thus the operation is inconvenient.

SUMMARY

Embodiments of the present disclosure are intended to provide a method and apparatus for adjusting a projection picture, and a projection device. By this method, a complete projection picture is acquired with no need of manually moving the projection device.

To solve the above technical problem, one technical solution employed by the embodiments of the present disclosure is a method for adjusting a projection picture, applicable to a projection device. The projection device includes a projecting module, a first imaging module, a second imaging module, and a position adjusting module, wherein the projecting module, the first imaging module, and the second imaging module are all disposed in the position adjusting module, the projecting module is configured to project an image, and the position adjusting module is configured to adjust positions of the projecting module and the imaging module such that the projection picture is adjusted. The method includes: receiving a first image, captured by the first imaging module, of a position where the projection picture is located, and a second image, captured by the second imaging module, of surroundings of the projection device; identifying, based on the first image, whether a projection shade is present within a projection range of the projecting module; identifying position information of the projection shade in response to the projection shade being present; identifying, based on the second image, movable directions of the projection device and movable distances of the projection device in the movable directions; and controlling, based on the position information of the projection shade and in combination with the movable directions of the projection device and the movable distances in the movable directions, the position adjusting module to adjust the projection device, such that the projection range of the projecting module escapes from the projection shade and a complete projection picture is acquired.

Optionally, the movable directions include an advance direction; and controlling, based on the position information of the projection shade and in combination with the movable directions of the projection device and the movable distances in the movable directions, the position adjusting module to adjust the projection device further includes: calculating, based on the position information of the projection shade, a distance to advance of the projection device, wherein the distance to advance is such a distance to advance that the projection range of the projection device is capable of escaping from the projection shade; determining whether the distance to advance is less than or equal to a movable distance in an advance direction; and controlling the position adjusting module to move forward by the distance to advance in response to the distance to advance being less than or equal to the movable distance in the advance direction.

Optionally, the position information includes a spacing distance between the first imaging module and the projection shade, and an included angle between a connection line connecting the first imaging module and the projection shade and a central line, wherein the central line is parallel to an optical axis of the projecting module; and calculating, based on the position information of the projection shade, the distance to advance of the projection device further includes: identifying an orientation of the projection picture relative to the projection shade based on the first image, wherein the orientation includes a vertical orientation and a horizontal orientation; calculating a distance from the projection shade to the optical axis of the projecting module based on a distance component between the projecting module and the first imaging module in the orientation, the spacing distance between the first imaging module and the projection shade, and the included angle between the connection line connecting the first imaging module and the projection shade and the central line; and calculating the distance to advance based on a divergence angle of the projecting module and the distance from the projection shade to the optical axis of the projecting module.

Optionally, the distance from the projection shade to the optical axis of the projecting module is calculated by using the following formula:

$$D_3 = D_1 * \sin\alpha \pm D_2 \qquad (1)$$

wherein $D_3$ represents the distance from the projection shade to the optical axis of the projecting module, $D_1$ represents the spacing distance between the first imaging module and the projection shade, $\alpha$ represents the included angle between the connection line connecting the first imaging module and the projection shade and the central line, and $D_2$ represents the distance component between the projecting module and the first imaging module in the orientation; and in the orientation, in the case that the projecting module is positioned between the first imaging module and the projection shade, the formula (1) is $D_3=D_1*\sin \alpha-D_2$, and in the case that the first imaging module is positioned between the projecting module and the projection shade, the formula (1) is $D_3=D_1*\sin \alpha+D_2$.

Optionally, the distance to advance is calculated by using the following formula:

$$D_5 = D_1 * \cos\alpha \pm D_4 - D_3 * \cot\beta \qquad (2)$$

wherein $D_5$ represents the distance to advance, $D_4$ represents a distance component between the projecting module and the first imaging module in the advance direction, and $\beta$ represents the divergence angle of the projecting module; and in the advance direction, in the case that the projecting module is positioned between the first imaging module and the projection shade, the formula (2) is $D_5=D_1*\cos \alpha-D_4-D_3*\cot \beta$, and in the case that the first imaging module is positioned between the projecting module and the projection shade, the formula (2) is $D_5=D_1*\cos \alpha+D_4-D_3*\cot \beta$.

Optionally, the method further includes: identifying whether the projection shade is positioned in the horizontal orientation of the projection picture in response to the distance to advance being greater than the movable distance in the advance direction; identifying, based on the first image, whether another projection shade is present in a direction opposite to the projection shade in the horizontal orientation in response to the projection shade being positioned in the horizontal orientation of the projection picture; calculating a distance between the another projection shade and the projection picture in response to identifying that the another projection shade is present; calculating a distance from the projection shade to the optical axis of the projecting module based on a distance component between the projecting module and the first imaging module in the horizontal orientation, the spacing distance between the first imaging module and the projection shade, and the included angle between the connection line connecting the first imaging module and the projection shade and the central line; calculating a lateral movable distance desired by the projection device based on the distance from the projection shade to the optical axis of the projecting module; determining whether the lateral movable distance is less than or equal to the distance between the another projection shade and the projection picture; and controlling, in response to the lateral movable distance being less than or equal to the distance between the another projection shade and the projection picture, the position adjusting module to move such that the projection device laterally moves towards a direction opposite to the projection shade by the lateral movable distance.

To solve the above technical problem, another technical solution employed by the embodiments of the present disclosure is an apparatus for adjusting a projection picture, applicable to a projection device. The projection device includes a projecting module, a first imaging module, a second imaging module, and a position adjusting module, wherein the projecting module, the first imaging module, and the second imaging module are all disposed in the position adjusting module, the projecting module is configured to project an image, and the position adjusting module is configured to adjust positions of the projecting module and the imaging module such that the projection picture is adjusted. The apparatus includes: a receiving module, configured to receive a first image, captured by the first imaging module, of a position where the projection picture is located, and a second image, captured by the second imaging module, of surroundings of the projection device; a first identifying module, configured to identify, based on the first image, whether a projection shade is present within a projection range of the projecting module; a second identifying module, configured to identify position information of the projection shade in response to the projection shade being present within the projection range of the projecting module; a third identifying module, configured to identify, based on the second image, movable directions of the projection device and movable distances of the projection device in the movable directions; and a control module, configured to control, based on the position information of the projection shade and in combination with the movable directions of the projection device and the movable distances in the movable directions, the position adjusting module to adjust the projection device, such that the projection range of the projecting module escapes from the projection shade and a complete projection picture is acquired.

Optionally, the movable directions include an advance direction; and the control module includes: a first calculating unit, configured to calculate, based on the position information of the projection shade, a distance to advance of the projection device, wherein the distance to advance is such a distance to advance that the projection range of the projection device is capable of escaping from the projection shade; a first determining unit, configured to determine whether the distance to advance is less than or equal to a movable distance in an advance direction; and a first control unit, configured to control the position adjusting module to move forward by the distance to advance in response to the distance to advance being less than or equal to the movable distance in the advance direction.

Optionally, the position information includes a spacing distance between the first imaging module and the projection shade, and an included angle between a connection line connecting the first imaging module and the projection shade and a central line, wherein the central line is parallel to an optical axis of the projecting module; and the calculating unit is specifically configured to: identify an orientation of the projection picture relative to the projection shade based on the first image, wherein the orientation includes a vertical orientation and a horizontal orientation; calculate a distance from the projection shade to the optical axis of the projecting module based on a distance component between the projecting module and the first imaging module in the orientation, the spacing distance between the first imaging module and the projection shade, and the included angle between the connection line connecting the first imaging module and the projection shade and the central line; and calculate the distance to advance based on a divergence angle of the projecting module and the distance from the projection shade to the optical axis of the projecting module.

Optionally, the distance from the projection shade to the optical axis of the projecting module is calculated by using the following formula:

$$D_3 = D_1 * \sin\alpha \pm D_2 \qquad (1)$$

wherein $D_3$ represents the distance from the projection shade to the optical axis of the projecting module, $D_1$ represents the spacing distance between the first imaging module and the projection shade, $\alpha$ represents the included angle between the connection line connecting the first imaging module and the projection shade and the central line, and $D_2$ represents the distance component between the projecting module and the first imaging module in the orientation; and in the orientation, in the case that the projecting module is positioned between the first imaging module and the projection shade, the formula (1) is $D_3=D_1*\sin\alpha-D_2$, and in the case that the first imaging module is positioned between the projecting module and the projection shade, the formula (1) is $D_3=D_1*\sin\alpha+D_2$.

Optionally, the distance to advance is calculated by using the following formula:

$$D_5 = D_1 * \cos\alpha \pm D_4 - D_3 * \cot\beta \qquad (2)$$

wherein $D_5$ represents the distance to advance, $D_4$ represents a distance component between the projecting module and the first imaging module in the advance direction, and $\beta$ represents the divergence angle of the projecting module; and in the advance direction, in the case that the projecting module is positioned between the first imaging module and the projection shade, the formula (2) is $D_5=D_1*\cos\alpha-D_4-D_3*\cot\beta$, and in the case that the first imaging module is positioned between the projecting module and the projection shade, the formula (2) is $D_5=D_1*\cos\alpha+D_4-D_3*\cot\beta$.

Optionally, the apparatus further includes: a first identifying unit, configured to identify whether the projection shade is positioned in the horizontal orientation of the projection picture in response to the distance to advance being greater than the movable distance in the advance direction; a second identifying unit, configured to identify, based on the first image, whether another projection shade is present in a direction opposite to the projection shade in the horizontal orientation in response to the projection shade being positioned in the horizontal orientation of the projection picture; a second calculating unit, configured to calculate a distance between the another projection shade and the projection picture in response to identifying that the another projection shade is present in the direction opposite to the projection shade in the horizontal orientation; a third calculating unit, configured to calculate a distance from the projection shade to the optical axis of the projecting module based on a distance component between the projecting module and the first imaging module in the horizontal orientation, the spacing distance between the first imaging module and the projection shade, and the included angle between the connection line connecting the first imaging module and the projection shade and the central line; and a fourth calculating unit, configured to calculate a lateral movable distance desired by the projection device based on the distance from the projection shade to the optical axis of the projecting module; a second determining unit, configured to determine whether the lateral movable distance is less than or equal to the distance between the another projection shade and the projection picture; and a second control unit, configured to control, in response to the lateral movable distance being less than or equal to the distance between the another projection shade and the projection picture, the position adjusting module to move such that the projection device laterally moves towards a direction opposite to the projection shade by the lateral movable distance.

To solve the above technical problem, another technical solution employed by the embodiments of the present disclosure is a projection device. The projection device includes a projecting module, configured to project an image; a first imaging module, configured to capture a first image of a position where a projection picture is located; a second imaging module, configured to capture a second image of surroundings of the projection device; a position adjusting module, wherein the projecting module, the first imaging module, and the second imaging module are all disposed in the position adjusting module, and the position adjusting module is configured to adjust positions of the projecting module and the imaging module such that the projection picture is adjusted; and a controller including at least one processor and a memory, wherein the at least one processor is connected to the projecting module, the first imaging module, the second imaging module, and the position adjusting module, the memory is communicably connected to the at least one processor, and stores one or more instructions executable by the at least one processor, and the at least one processor, when executing the one or more instructions, is caused to perform the method as described above.

The embodiments of the present disclosure may achieve the following beneficial effects: A method and apparatus for adjusting a projection picture, and a projection device are provided. The method for adjusting a projection picture includes: receiving a first image, captured by the first imaging module, of a position where the projection picture is located, and a second image, captured by the second imaging module, of surroundings of the projection device; identifying, based on the first image, whether a projection shade is present within a projection range of the projecting module; identifying position information of the projection shade in response to the projection shade being present; identifying, based on the second image, movable directions of the projection device and movable distances of the projection device in the movable directions; and controlling, based on the position information of the projection shade and in combination with the movable directions of the projection device and the movable distances in the movable directions, the position adjusting module to adjust the projection device, such that the projection range of the projecting module escapes from the projection shade and a complete projection picture is acquired. By this method, the complete projection picture is acquired with no need of manually moving the projection device, and the operation is very convenient.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For clearer descriptions of the objectives, technical solutions, and advantages of the embodiments of the present disclosure, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. It should be understood that the specific embodiments described herein are only intended to explain the present disclosure instead of limiting the present disclosure. Based on the embodiments of the present disclosure, all other embodiments derived by persons of ordinary skill in the art without any creative efforts shall fall within the protection scope of the present disclosure.

It should be noted that, when an element is defined as "being secured or fixed to" another element, the element may be directly positioned on the element or one or more centered elements may be present therebetween. When an element is defined as "being connected or coupled to" another element, the element may be directly connected or coupled to the element or one or more centered elements may be present therebetween. As used herein, the terms "vertical," "horizontal," "left," "right," and similar expressions are for illustration purposes.

In addition, technical features involved in various embodiments of the present disclosure described hereinafter may be combined as long as these technical features are not in conflict.

Figure 1:
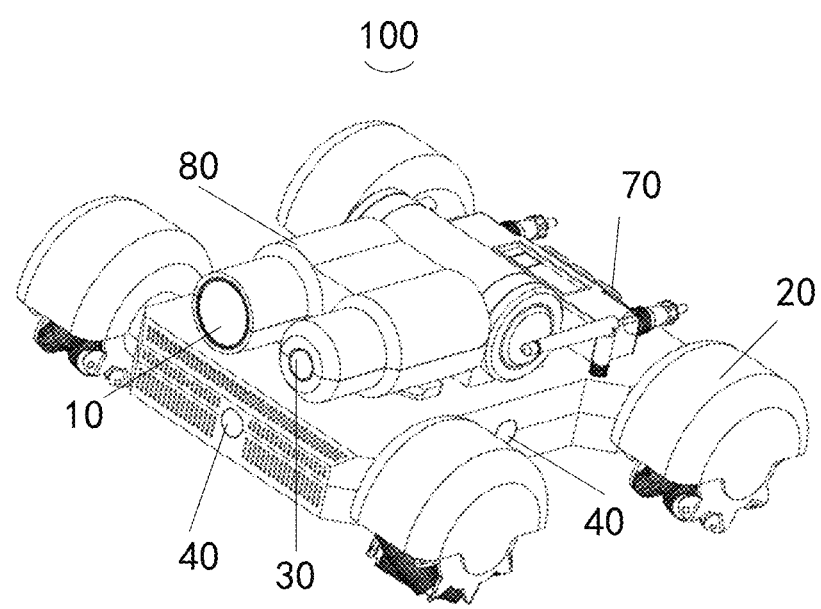
FIG. 1 is a schematic diagram of a projection device according to an embodiment of the present disclosure.
Figure 2:
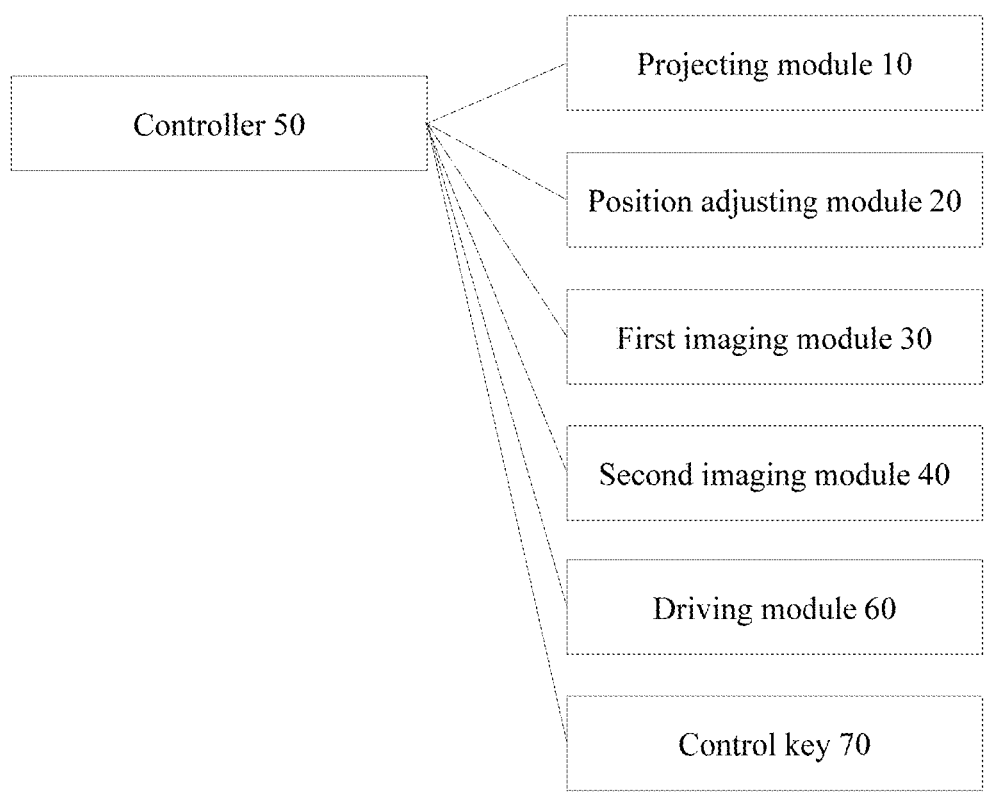
FIG. 2 is a diagram illustrating connections between parts of the projection device according to an embodiment of the present disclosure.

Referring to FIG. 1 and FIG. 2, a projection device 100 includes a projecting module 10, a position adjusting module 20, a first imaging module 30, a second imaging module 40, a controller 50, a driving module 60, and a control key 70. The projecting module 10 is configured to project an image. The first imaging module 30 is configured to capture a first image of a position where a projection picture is located. The second imaging module 40 is configured to acquire a second image of surroundings of the projection device 100. The projecting module 10, the first imaging module 30, and the second imaging module 40 are all disposed in the position adjusting module 20, and the position adjusting module 20 is configured to adjust positions of the projecting module 10 and the imaging module such that the projection picture is adjusted. The controller 50 is connected to the projecting module 10, the first imaging module 30, the second imaging module 40, the position adjusting module 20, the driving module 60, and the control key 70. The controller 50 is configured to control the projecting module 10 to project an image, control the first imaging module 30 to capture a first image of a position where a projection picture is located, control the second imaging module 40 to capture a second image of surroundings of the projection device 100, control the position adjusting module 20 to adjust positions of the projecting module 10 and the imaging module such that the projection picture is adjusted, and control the driving module 60 to adjust a pitch angle of the projecting module 10 such that the projection picture is adjusted. The control key 70 is configured to cause the controller 50 to be disconnected from the position adjusting module 20.

The projecting module 10 is configured to project an image. In some embodiments, the projecting module 10 includes a projection optical engine.

Figure 3:
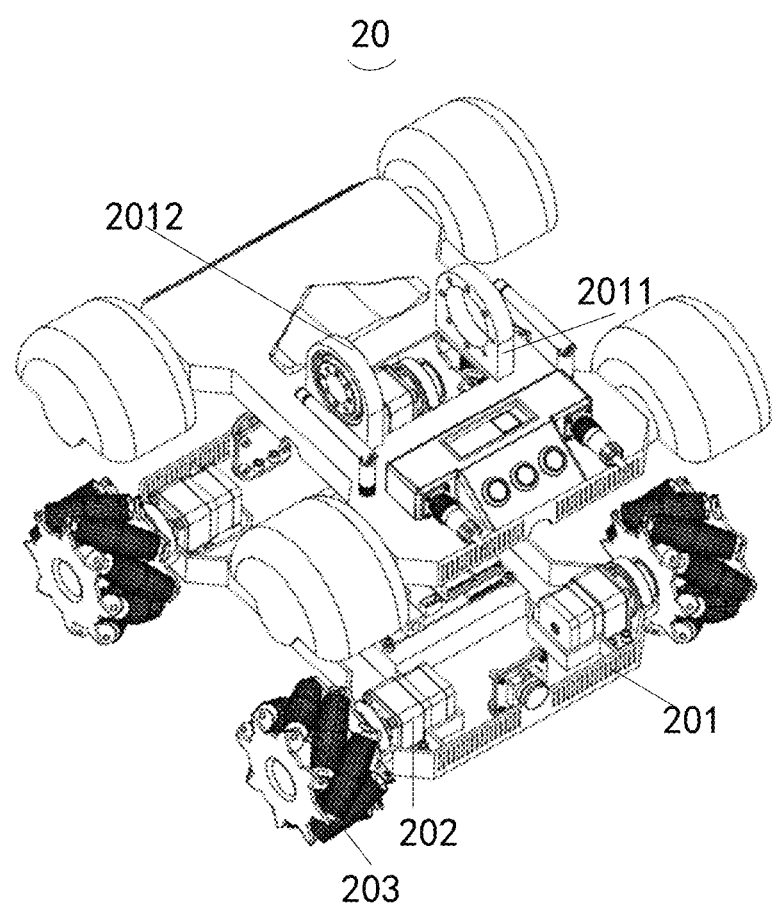
FIG. 3 is a schematic exploded diagram of a position adjusting module according to an embodiment of the present disclosure.

With respect to the position adjusting module 20, referring to FIG. 3, the position adjusting module 20 includes a base 201, a driving unit 202, and a mecanum wheel 203; wherein the driving unit 202 is disposed on the base 201, rotatably connected to the mecanum wheel 203, and connected to the controller 50, the projecting module 10 is disposed on the base 201, and the driving unit 202 is configured to supply power to the mecanum wheel 203 to adjust a position of the base 201, and to hence adjust the position of the projecting module 10.

It should be noted that it is the related art that the driving unit 202 supplies power to the mecanum wheel 203 to adjust the position of the base 201, and to hence adjust the position of the projecting module 10, which is not detailed herein any further.

It should be noted that, in some embodiments, the driving unit 202 is a motor.

It should be noted that, in some embodiments, the base 201 is provided with a first bracket 2011 and a second bracket 2012, wherein the first bracket 2011 is opposite to the second bracket 2012. The first bracket 2011 and the second bracket 2012 are connected to a housing 80.

It should be noted that, in some embodiments, four mecanum wheels 203 are provided, wherein two of the mecanum wheels 203 are disposed on one side of the base 201, and the other two of the mecanum wheels 203 are disposed on the other side opposite to the one side of the base 201; and four driving units 202 are provided, wherein each of the driving units 202 corresponds to one of the mecanum wheels 203.

With respect to the first imaging module 30, referring to FIG. 1, the first imaging module 30 is fixedly connected to the projecting module 10 via the housing 80, that is, the position adjusting module 20 or the driving module 60 may simultaneously adjust the first imaging module 30 and the first imaging module 30.

Figure 4:
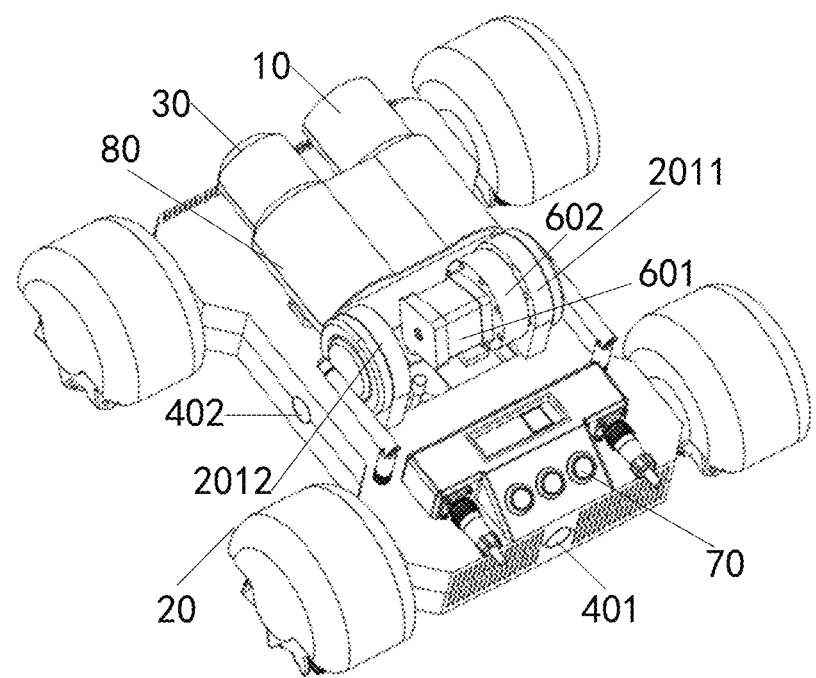
FIG. 4 is a schematic partial diagram of a projection device according to an embodiment of the present disclosure.

With respect to the second imaging module 40, referring to FIG. 4, the second imaging module 40 is disposed on the base 201, and configured to acquire an image of surroundings of the projection device 100. In some embodiments, the second imaging module 40 includes a first camera 401, a second camera 402, a third camera (not illustrated), and a fourth camera (not illustrated); wherein the first camera 401, the second camera 402, the third camera, and the fourth camera are respectively disposed on four side surfaces of the base 201.

With respect to the driving module 60, referring to FIG. 4, the driving module 60 is connected to the projecting module 10, and configured to drive the housing 80 to rotate relative to the base 201, such that a pitch angle of the projecting module 10 is adjusted. In some embodiments, the driving module 60 is a motor.

It should be noted that, in some embodiments, the driving module 60 includes a fixing portion 601 and a driving portion (not illustrated), wherein the fixing portion 601 is fixed to the first bracket 2011, and the driving portion is rotatable relative to the fixing portion 601, and connected to the housing 80. The driving portion of the driving module 60 is capable of driving the housing 80 to rotate to drive the projecting module 10 and the first imaging module 30 to rotate, such that the pitch angle of the projecting module 10 is adjusted.

It should be noted that, in some embodiments, the driving module 60 further includes a decelerator 602, wherein the fixing portion 601 is connected to one end of the decelerator 602, and the other end of the decelerator 602 is fixed to the first bracket 2011. By configuring the decelerator 602, the driving module 60 is stable during the start. In some embodiments, the decelerator 602 is a harmonic reducer.

With respect to the control key 70, referring to FIG. 1 and FIG. 2, the control key 70 is connected to the controller 50 and the position adjusting module 20, and configured to cause the controller 50 to be disconnected from the position adjusting module 20, or configured to cause the controller 50 to be connected to the position adjusting module 20. By configuring the control key 70, in the case that the projection picture of the projecting module 10 is complete, the projection device 100 may be locked by the control key 70, such that the projection device 100 is prevented from being triggered by mistakes, and the controller 50 controls the position adjusting module 20 to adjust the position of the projecting module 10.

With respect to the controller 50, referring to FIG. 2, the controller 50 includes at least one processor and a memory. The processor is connected to the projecting module 10, the first imaging module 30, the second imaging module 40, and the position adjusting module 20. The processor is configured to perform the method for adjusting the projection picture according to the embodiments of the present disclosure. Specifically, the processor is configured to control, based on the first image captured by the first imaging module 30, and the second image captured by the second imaging module 40, the position adjusting module 20 to adjust the projection device 100, such that a projection range of the projecting module 10 escapes from the projection shade and a complete projection picture is acquired.

By the projection device 100, in the case that the controller 50 identifies, based on the first image captured by the first imaging module 30, that the projection shade is present within the projection range of the projecting module 10, the controller 50 may control the position adjusting module 20 to adjust the projection device 100 such that the projection range of the projecting module 10 escapes from the projection shade, and thus a complete projection picture is acquired. In this way, the complete projection picture is acquired with no need of moving the projection device 100, and the operation is very convenient.

Figure 5:
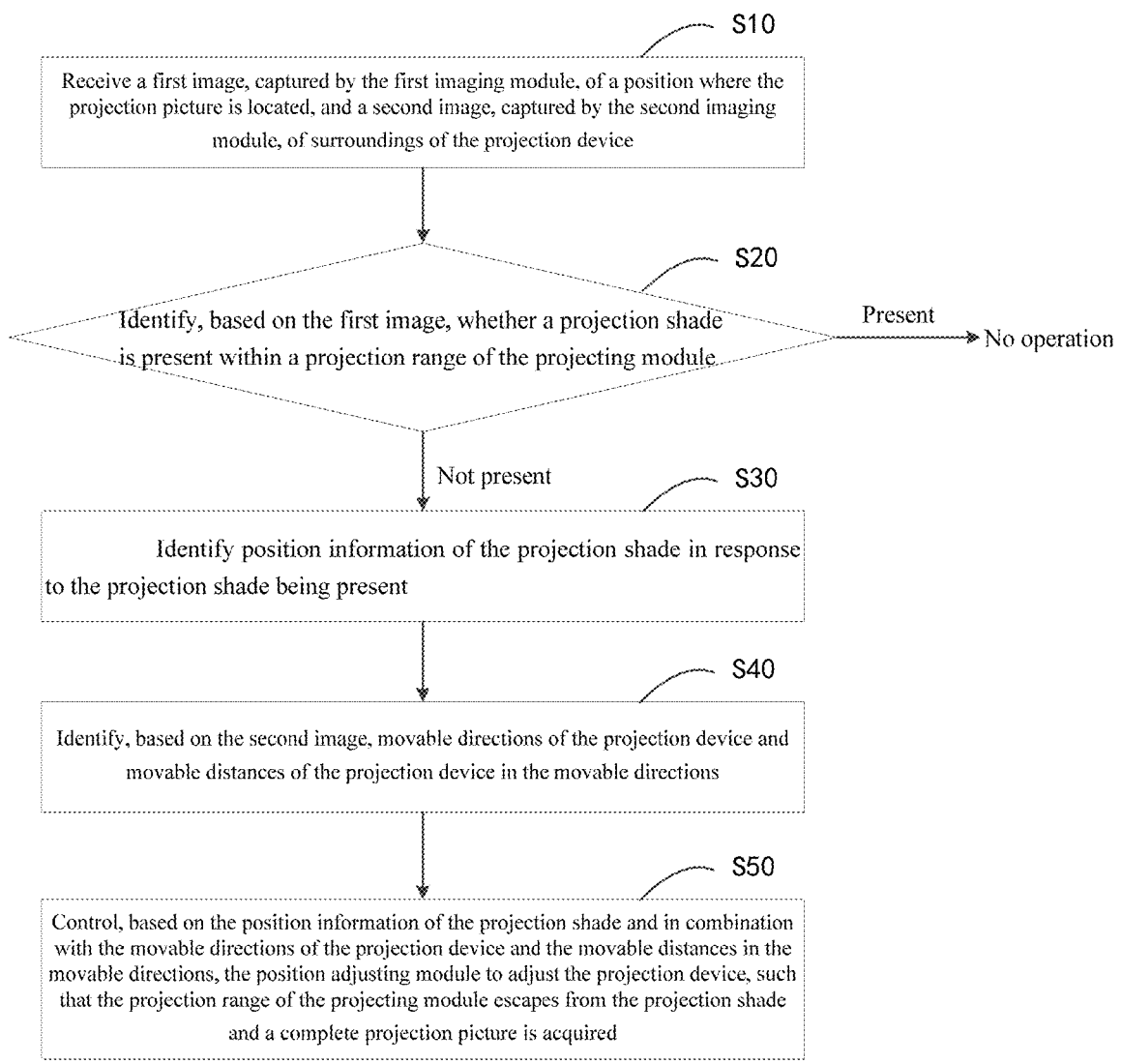
FIG. 5 is a schematic flowchart of a method for adjusting a projection picture according to an embodiment of the present disclosure.

Referring to FIG. 5, FIG. 5 is a schematic flowchart of a method for adjusting a projection picture according to an embodiment of the present disclosure. The method is applicable to a projection device. The method includes the following steps:

In step S10, a first image, captured by the first imaging module, of a position where the projection picture is located, and a second image, captured by the second imaging module, of surroundings of the projection device are acquired.

Based on the first image, whether a projection shade is present within a projection range of the projecting module is identified. Further, based on the first image, the first imaging module identifies position information of the projection shade, an orientation of the projection shade, and an included angle between a connection line connecting the first imaging module and the projection shade and a central line, and the like. The central line is parallel to an optical axis of the projecting module.

Based on the second image, movable directions of the projection device and movable distances of the projection device in the movable directions are further identified.

In step S20, whether a projection shade is present within a projection range of the projecting module is identified based on the first image. In the case that the projection shade is present, step S30 is performed; and otherwise, no operation is performed.

It should be noted that in the case that no projection shade is present within the projection range of the projecting module, in some embodiments, the position adjusting module may be locked by pressing the control key, such that the case where the controller 50 controls the position adjusting module 20 to adjust the position of the projecting module 10 in response to the projection device being mis-touched is prevented.

In step 30, position information of the projection shade is identified.

The position information of the projection shade may be identified based on the first imaging module and the first image captured by the first imaging module.

In step S40, movable directions of the projection device and movable distances of the projection device in the movable directions are identified based on the second image.

It should be noted that generally, the projection device is placed on a projection platform, and the movable distances in the movable directions are distances from peripheral edges of the projection device to peripheral edges of the projection platform. In the case that the distance from one edge of the projection device to one edge of the projection platform, the direction of this edge of the projection device is the movable direction. In the case that the distance from another edge of the projection device to another edge of the projection platform, the direction of this edge of the projection device is an unmovable direction.

Figure 6:
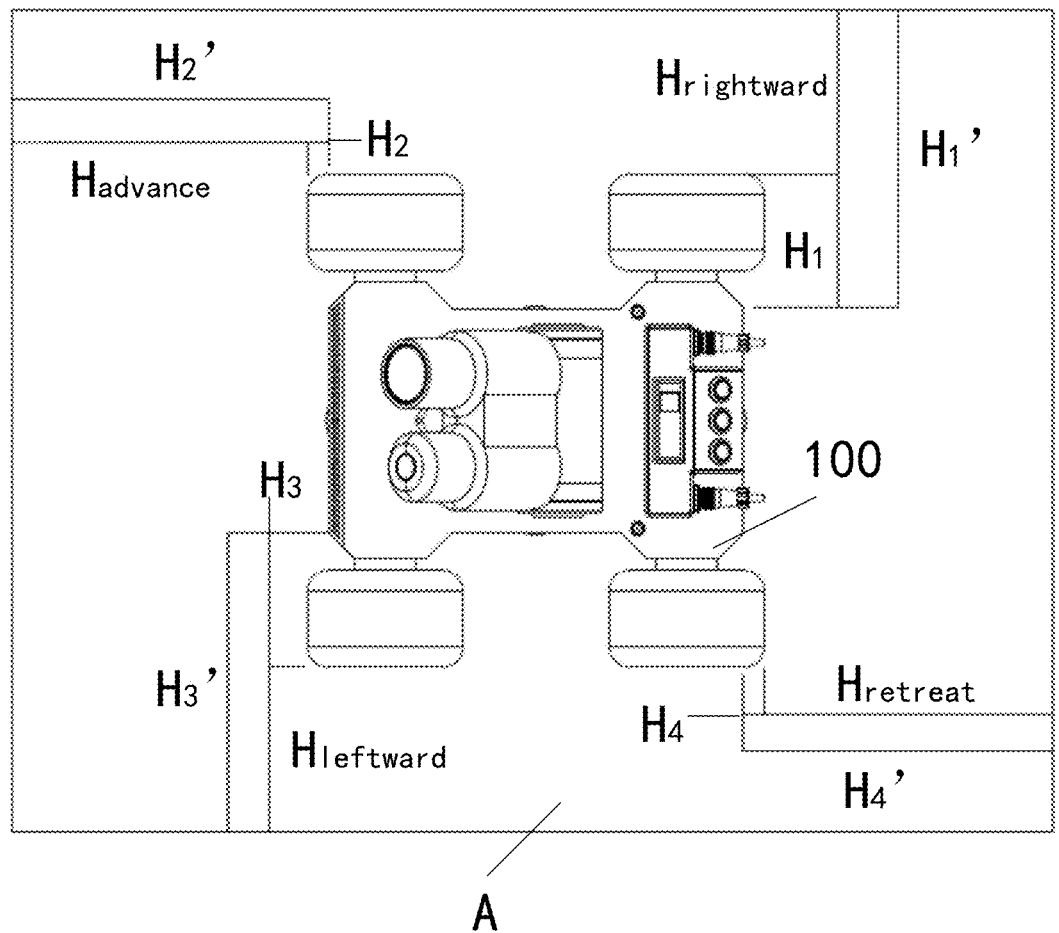
FIG. 6 is a schematic diagram of movable directions and movable distances in the movable directions of a projection device according to an embodiment of the present disclosure.

Referring to FIG. 6, FIG. 6 illustrates a movable distance $H_{advance}$ in an advance direction, a movable distance $H_{retreat}$ in a retreat direction, a movable distance $H_{leftward}$ in a leftward direction, and a movable distance $H_{rightward}$ in a rightward direction. $H_{rightward}=H_1'-H_1$, $H_{advance}=H_2'-H_2$, $H_{leftward}=H_3'-H_3$, and $H_{retreat}=H_4'-H_4$. $H_1'$, $H_2'$, $H_3'$, and $H_4'$ represent the distances from the second imaging module to the peripheral edges of the projection platform that are measured by the second imaging module based on the second image. $H_1$, $H_2$, $H_3$, and $H_4$ represent physical structural sizes of the projection device, and are known values.

It may be understood that in the case that $H_{advance}$ is greater than zero, the advance direction is the movable direction. In the case that $H_{retreat}$ is greater than zero, the retreat direction is the movable direction. In the case that $H_{leftward}$ is greater than zero, the leftward direction is the movable direction. In the case that $H_{right}$ is greater than zero, the rightward direction is the movable direction.

In step S50, based on the position information of the projection shade and in combination with the movable directions of the projection device and the movable distances in the movable directions, the position adjusting module is controlled to adjust the projection device, such that the projection range of the projecting module escapes from the projection shade and a complete projection picture is acquired.

Figure 7:
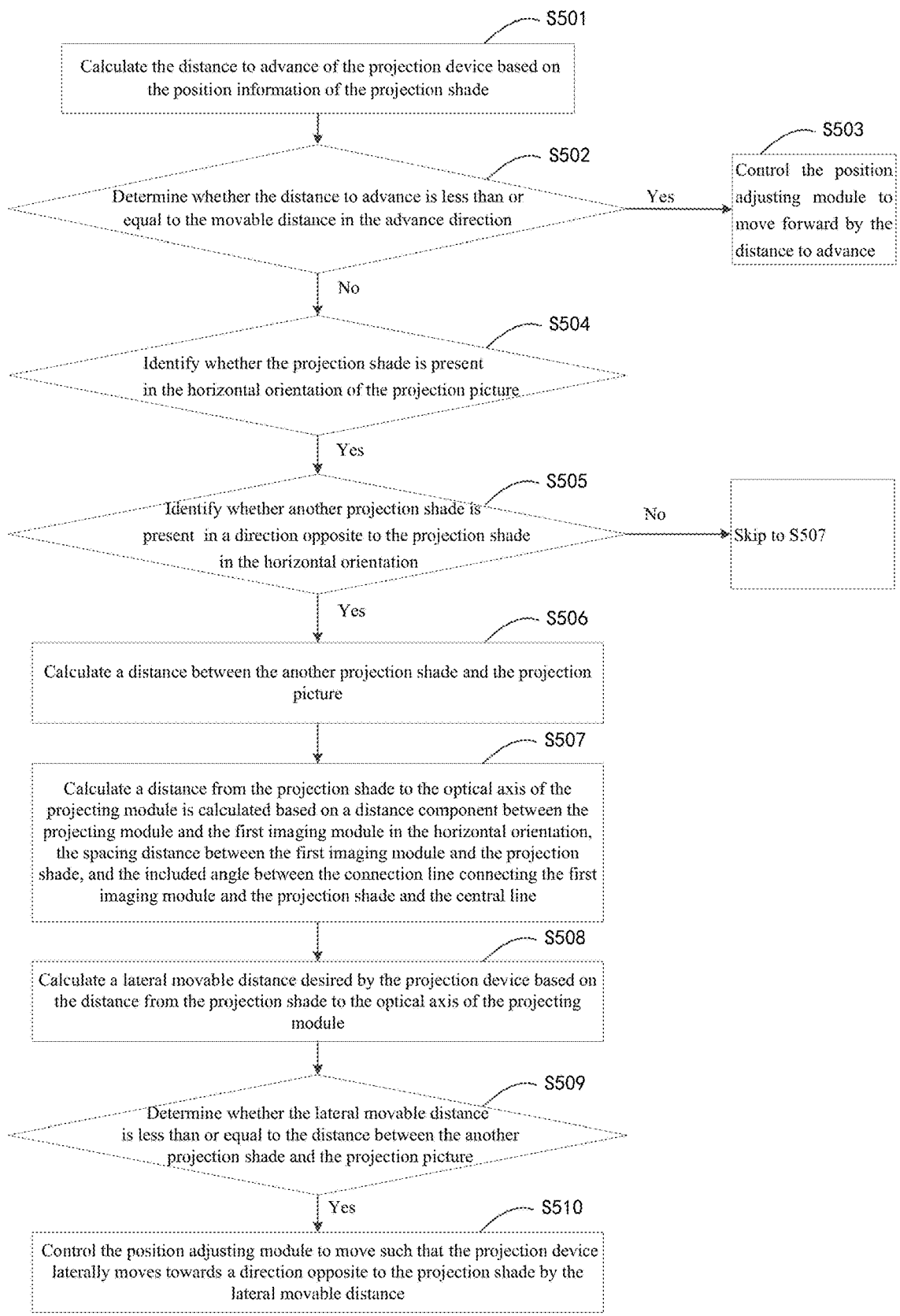
FIG. 7 is a schematic diagram of a route by which the position adjusting module adjusts the projection device according to an embodiment of the present disclosure.

In the case that the projection shade is present within the projection range of the projecting module, the position adjusting module is preferentially controlled to advance to decrease the projection picture to escape from the projection shade. The movable directions include an advance direction, and referring to FIG. 7, step S50 specifically includes the following sub-steps:

In sub-step S501, the distance to advance of the projection device is calculated based on the position information of the projection shade.

The distance to advance is such a distance to advance that the projection range of the projection device is capable of escaping from the projection shade.

Sub-step S501 specifically includes: identifying an orientation of the projection picture relative to the projection shade based on the first image, wherein the orientation includes a vertical orientation and a horizontal orientation; calculating a distance from the projection shade to the optical axis of the projecting module based on a distance component between the projecting module and the first imaging module in the orientation, the spacing distance between the first imaging module and the projection shade, and the included angle between the connection line connecting the first imaging module and the projection shade and the central line; and calculating the distance to advance based on a divergence angle of the projecting module and the distance from the projection shade to the optical axis of the projecting module.

In some embodiments, the distance from the projection shade to the optical axis of the projecting module is calculated by using the following formula:

$$D_3 = D_1 * \sin\alpha \pm D_2 \qquad (1)$$

Figure 8:
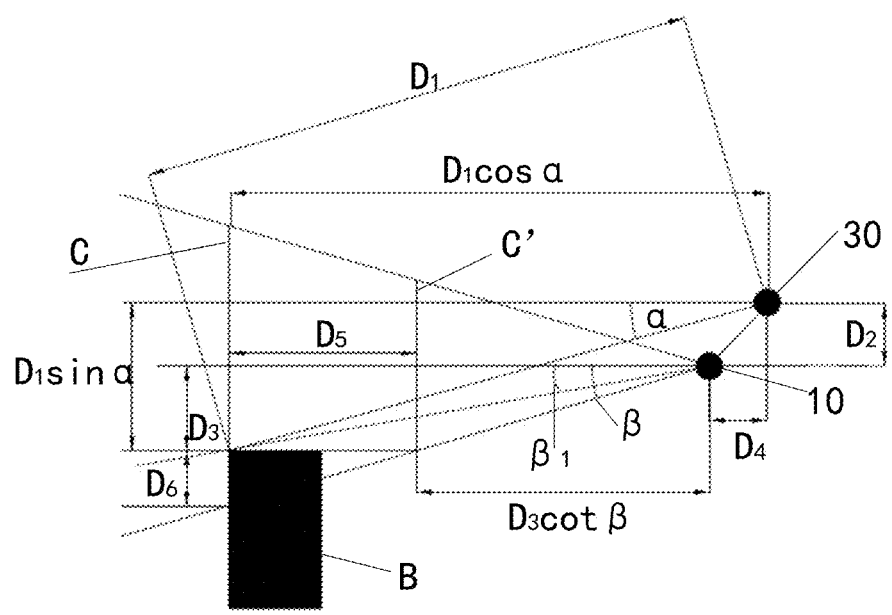
FIG. 8 is a schematic diagram illustrating that the projecting module is positioned between a first imaging module and a projection shade according to an embodiment of the present disclosure.
Figure 9:
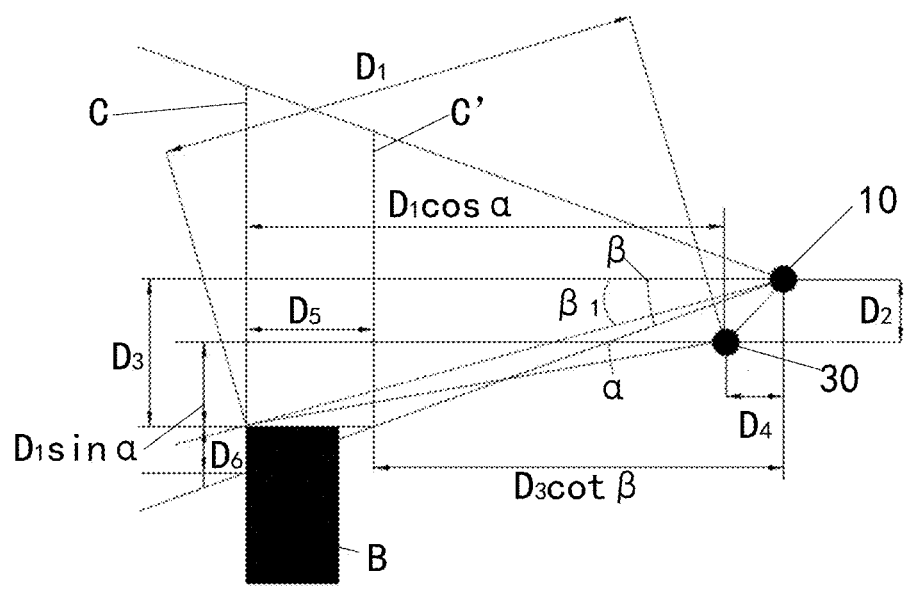
FIG. 9 is a schematic diagram illustrating that the first imaging module is positioned between the projecting module and the projection shade according to an embodiment of the present disclosure.

Referring to FIG. 8 and FIG. 9, $D_3$ represents the distance from the projection shade B to the optical axis of the projecting module 10, $D_1$ represents the spacing distance between the first imaging module 30 and the projection shade B, $\alpha$ represents the included angle between the connection line connecting the first imaging module 30 and the projection shade B and the central line, $D_2$ represents the distance component between the projecting module 10 and the first imaging module 30 in the orientation, and the projection picture C with the size adjusted is a projection picture C'. In the orientation, in the case that the projecting module 10 is positioned between the first imaging module 30 and the projection shade B, referring to FIG. 8, the formula (1), the formula (1) is $D_3=D_1*\sin\alpha-D_2$, and in the case that the first imaging module 30 is positioned between the projecting module 10 and the projection shade B, referring to FIG. 9, the formula (1) is $D_3=D_1*\sin\alpha+D_2$.

It should be noted that in the case that the orientation is the vertical orientation, $D_2$ represents a distance component between the projecting module 10 and the first imaging module 30 in the vertical orientation.

It should be noted that in the case that the orientation is the horizontal orientation, $D_2$ represents a distance component between the projecting module 10 and the first imaging module 30 in the horizontal orientation.

In some embodiments, the distance to advance is calculated by using the following formula:

$$D_5 = D_1 * \cos\alpha \pm D_4 - D_3 * \cot\beta \qquad (2)$$

Referring to FIG. 8 and FIG. 9, $D_5$ represents the distance to advance, $D_4$ represents a distance component between the projecting module 10 and the first imaging module 30 in the advance direction, and $\beta$ represents the divergence angle of the projecting module 10. In the advance direction, in the case that the projecting module 10 is positioned between the first imaging module 30 and the projection shade B, referring to FIG. 8, the formula (2) is $D_5=D_1*\cos\alpha-D_4-D_3*\cot\beta$, and in the case that the first imaging module 30 is positioned between the projecting module 10 and the projection shade B, referring to FIG. 9, the formula (2) is $D_5=D_1*\cos\alpha+D_4-D_3*\cot\beta$.

It should be noted that in the case that the orientation is the vertical orientation, $\beta$ represents a divergence angle of the projecting module 10 in the vertical orientation.

It should be noted that in the case that the orientation is the horizontal orientation, $\beta$ represents a divergence angle of the projecting module 10 in the horizontal orientation.

Figure 10:
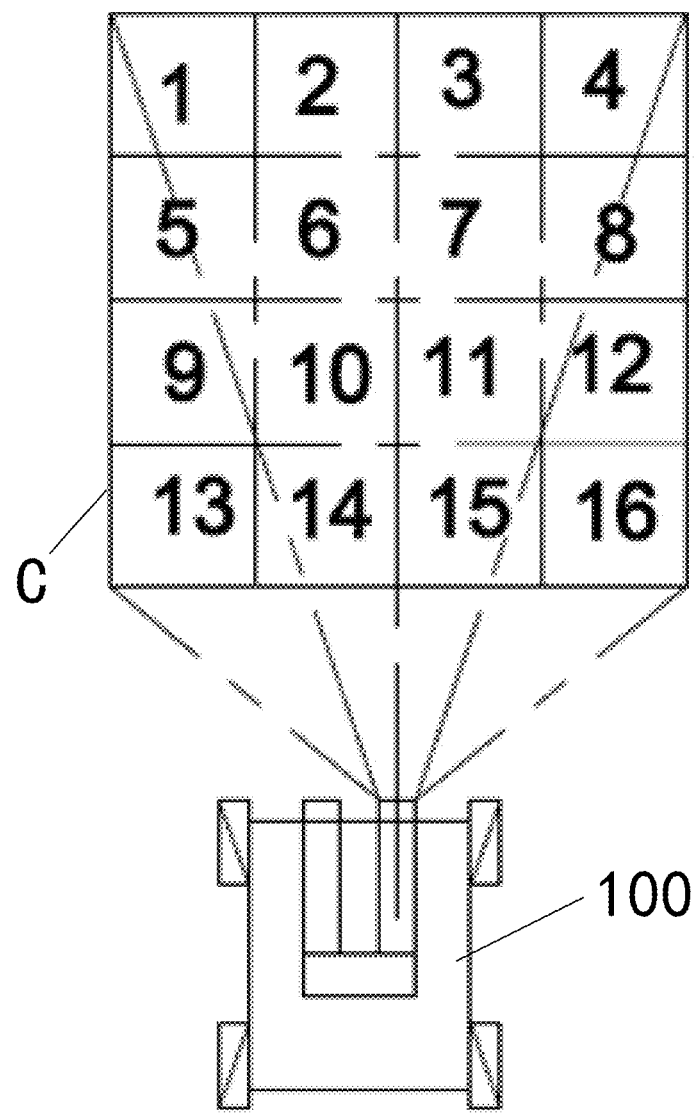
FIG. 10 is a schematic diagram illustrating that the projection picture is divided into 4×4 spaces according to an embodiment of the present disclosure.

It should be noted that in some embodiments, the projection picture C is divided into 4×4 spaces, that is, totally 16 spaces, No. 1, 2, 3, 4, 5, 6, 7, 8, 9, 10, 11, 12, 13, 14, 15, and 16, as illustrated in FIG. 10.

In the case that the projection shade is present in space 1 and/or space 2 and/or space 3 and/or space 4, or the projection shade is present in space 13 and/or space 14 and/or space 15 and/or space 16, it is considered that an orientation of the projection shade relative to the projection picture is the vertical orientation.

In the case that the projection shade is present in space 1 and/or space 5 and/or space 9 and/or space 13, or the projection shade is present in space 4 and/or space 8 and/or space 12 and/or space 16, it is considered that an orientation of the projection shade relative to the projection picture is the horizontal orientation.

In the case that the projection shade is positioned in space 6 and/or space 7 and/or space 10 and/or space 11, the projection device fails to escape from the projection shade, and the position of the projection device may be manually adjusted.

In sub-step S502, whether the distance to advance is less than or equal to the movable distance in the advance direction is determined. In the case that the distance to advance is less than or equal to the movable distance in the advance direction, sub-step S503 is performed; and otherwise, sub-step S504 is performed.

Referring to FIG. 6 and FIG. 8, or referring to FIG. 6 and FIG. 9, whether the distance to advance is less than or equal to the movable distance in the advance direction may be determined by determining whether $D_5$ is less than or equal to $H_{advance}$.

In sub-step S503, the position adjusting module is controlled to move forward by the distance to advance.

In sub-step S504, whether the projection shade is present in the horizontal orientation of the projection picture is identified. In the case that the projection shade is present in the horizontal orientation of the projection picture, sub-step S505 is performed.

In sub-step S505, whether another projection shade is present in a direction opposite to the projection shade in the horizontal orientation is identified based on the first image, sub-step S506 is performed in response to another projection shade being positioned in the horizontal orientation; otherwise, the process skips to sub-step S507.

In sub-step S506, a distance between another projection shade and the projection picture is calculated.

The method for calculating a distance between another projection shade and the projection picture may refer to sub-step S507 and sub-step S508, which is not described herein any further.

In sub-step S507, a distance from the projection shade to the optical axis of the projecting module is calculated based on a distance component between the projecting module and the first imaging module in the horizontal orientation, the spacing distance between the first imaging module and the projection shade, and the included angle between the connection line connecting the first imaging module and the projection shade and the central line.

The distance from the projection shade to the optical axis of the projecting module may be calculated by reference to the formula (1), which is not described herein any further.

In sub-step S508, a lateral movable distance desired by the projection device is calculated based on the distance from the projection shade to the optical axis of the projecting module.

In some embodiments, the lateral movable distance desired by the projection device may be calculated by using the following formula:

$$D_6 = W - D_3 \quad (3)$$

Referring to FIG. 8 and FIG. 9, $D_6$ represents the lateral movable distance desired by the projection device, $D_6$ represents the distance between the projection shade and the projection picture, W represents a half width of the projection picture C in the horizontal orientation, $D_3$ represents the distance from the projection shade B to the optical axis of the projecting module 10, and $D_3$ may be acquired by calculation by using the formula (1).

In sub-step S509, whether the lateral movable distance is less than or equal to the distance between another projection shade and the projection picture is determined. In the case that the lateral movable distance is less than or equal to the distance between another projection shade and the projection picture, sub-step S510 is performed; and in the case that the lateral movable distance is greater than the distance between another projection shade and the projection picture, the position of the projection device may be manually adjusted.

In sub-step S510, the position adjusting module is controlled to move such that the projection device laterally moves towards a direction opposite to the projection shade by the lateral movable distance.

It should be noted that in some embodiments, the projection device further determines whether the lateral movable distance is less than or equal to the movable distance in the movable direction. In the case that the lateral movable distance is less than or equal to the movable distance in the movable direction, the position adjusting module is controlled to move; and otherwise, the position of the projection device is manually adjusted.

It should be noted that, even in the case of not controlling the position adjusting module to move, the projection device laterally may still be caused, in other fashions, to move towards a direction opposite to the projection shade by the lateral movable distance to escape from the projection shade. The projection device escapes from the projection shade by controlling the position adjusting module to rotate leftwards or rotate rightwards.

To escape from the projection shade, an angle by which the projecting module 10 needs to rotate leftwards or rotate rightwards is calculated by using the following formula:

$$\beta_2 = \beta - \beta_1 \quad (4)$$

Referring to FIG. 8 and FIG. 9, $\beta_2$ represents the angle by which the projecting module 10 needs to rotate leftwards or rotate rightwards, $\beta$ represents the divergence angle of the projecting module 10, $\beta_1$ represents an included angle between a divergence surface in response to the projecting module 10 escaping from the projection shade B and a projection optical axis of the original projecting module 10.

$\beta_1$ is calculated by using the following formula:

$$\beta_1 = \arctan(D_3 / (D_5 - D_3 * \cot\beta)) \quad (5)$$

Referring to FIG. 8 and FIG. 9, $\beta_1$ represents the included angle between the divergence surface in response to the projecting module 10 escaping from the projection shade B and the projection optical axis of the original projecting module 10, $D_3$ represents the distance from the projection shade B to the optical axis of the projecting module 10, $D_3$ may be acquired by calculation by using the formula (1), $\beta$ represents the divergence angle of the projecting module 10, $D_5$ represents the distance to advance, and $D_5$ may be acquired by calculation by using formula (2).

It should be noted that referring to FIG. 1, since the projecting module 10 is disposed in the position adjusting module 20, an angle by which the position adjusting module 20 needs to rotate leftwards or rotate rightwards is acquired by calculating the angle by which the projecting module 10 needs to rotate leftwards or rotate rightwards by using the formula (4) and the formula (5).

It should be noted that in the case that the projection shade is present in a vertical orientation of the projection picture, the pitch angle of the projecting module may be controlled and adjusted. Referring to FIG. 1 and FIG. 4, since the projecting module 10 is fixed into the housing 80, the pitch angle of the projecting module 10 may be controlled by the driving module 60. In the vertical orientation, an angle by which the projecting module 10 needs to rotate upwards or rotate downwards is acquired by calculation by using the formula (4) and the formula (5), which is not described herein any further. An angle by which the pitch angle of the projecting module needs to be adjusted is acquired by calculating the angle by which the projecting module 10 needs to rotate upwards or rotate downwards.

It may be understood that in some embodiments, the controller not only controls the position adjusting module to adjust the projection device such that the projection range of the projecting module escapes from the projection shade, but also controls the position adjusting module to adjust the projection device such that the projection range of the projecting module falls over the projection platform. Herein, the projection platform may be considered as the projection shade, and in this case, in the vertical orientation, a distance $D_6$ between the projection platform and the projection picture is calculated, the projection range of the projecting module falls over the projection platform as long as $D_6$ is greater than or equal to zero.

In the embodiments of the present disclosure, a first image, captured by the first imaging module, of a position where the projection picture is located, and a second image, captured by the second imaging module, of surroundings of the projection device are received; whether a projection shade is present within a projection range of the projecting module is identified based on the first image; position information of the projection shade is identified in response to the projection shade being present; movable directions of the projection device and movable distances of the projection device in the movable directions are identified based on the second image; and the position adjusting module is controlled to adjust the projection device based on the position information of the projection shade and in combination with the movable directions of the projection device and the movable distances in the movable directions, such that the projection range of the projecting module escapes from the projection shade and a complete projection picture is acquired. By this method, a complete projection picture is acquired with no need of manually moving the projection device, and the operation is very convenient.

Figure 11:
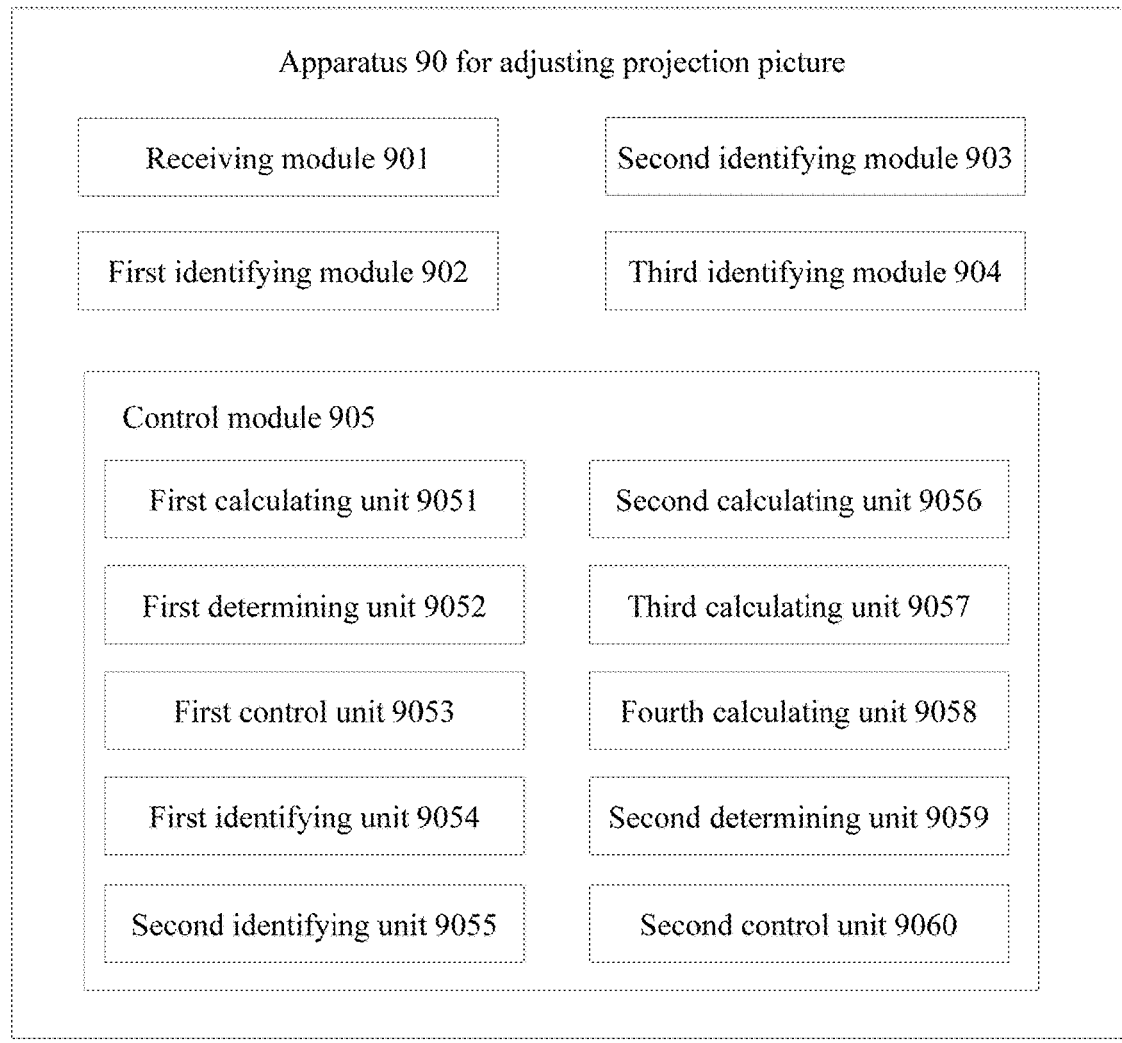
FIG. 11 is a schematic diagram of an apparatus for adjusting a projection picture according to an embodiment of the present disclosure.

Further, referring to FIG. 11, FIG. 11 is a schematic diagram of an apparatus for adjusting a projection picture according to an embodiment of the present disclosure. The apparatus 90 includes a receiving module 901, a first identifying module 902, a second identifying module 903, a third identifying module 904, and a control module 905. The receiving module 901 is configured to receive a first image, captured by the first imaging module, of a position where the projection picture is located, and a second image, captured by the second imaging module, of surroundings of the projection device. The first identifying module 902 is configured to identify, based on the first image, whether a projection shade is present within a projection range of the projecting module. The second identifying module 903 is configured to identify position information of the projection shade in response to the projection shade being present within the projection range of the projecting module. The third identifying module 904 is configured to identify, based on the second image, movable directions of the projection device and movable distances of the projection device in the movable directions. The control module 905 is configured to control, based on the position information of the projection shade and in combination with the movable directions of the projection device and the movable distances in the movable directions, the position adjusting module to adjust the projection device, such that the projection range of the projecting module escapes from the projection shade and a complete projection picture is acquired.

In some embodiments, the movable directions include an advance direction; and the control module 905 includes: a first calculating unit 9051, configured to calculate, based on the position information of the projection shade, a distance to advance of the projection device, wherein the distance to advance is such a distance to advance that the projection range of the projection device is capable of escaping from the projection shade; a first determining unit 9052, configured to determine whether the distance to advance is less than or equal to a movable distance in an advance direction; and a first control unit 9053, configured to control the position adjusting module to move forward by the distance to advance in response to the distance to advance being less than or equal to the movable distance in the advance direction.

In some embodiments, the position information includes a spacing distance between the first imaging module and the projection shade, and an included angle between a connection line connecting the first imaging module and the projection shade and a central line, wherein the central line is parallel to an optical axis of the projecting module; and the first calculating unit 9051 is specifically configured to: identify an orientation of the projection picture relative to the projection shade based on the first image, wherein the orientation includes a vertical orientation and a horizontal orientation; calculate a distance from the projection shade to the optical axis of the projecting module based on a distance component between the projecting module and the first imaging module in the orientation, the spacing distance between the first imaging module and the projection shade, and the included angle between the connection line connecting the first imaging module and the projection shade and the central line; and calculate the distance to advance based on a divergence angle of the projecting module and the distance from the projection shade to the optical axis of the projecting module.

In some embodiments, the distance from the projection shade to the optical axis of the projecting module is calculated by using the following formula:

$$D_3 = D_1 * \sin\alpha \pm D_2 \quad (1)$$

wherein $D_3$ represents the distance from the projection shade to the optical axis of the projecting module, $D_1$ represents the spacing distance between the first imaging module and the projection shade, $\alpha$ represents the included angle between the connection line connecting the first imaging module and the projection shade and the central line, and $D_2$ represents the distance component between the projecting module and the first imaging module in the orientation; and in the orientation, in the case that the projecting module is positioned between the first imaging module and the projection shade, the formula (1) is $D_3=D_1*\sin\alpha-D_2$, and in the case that the first imaging module is positioned between the projecting module and the projection shade, the formula (1) is $D_3=D_1*\sin\alpha+D_2$.

In some embodiments, the distance to advance is calculated by using the following formula:

$$D_5 = D_1 * \cos\alpha \pm D_4 - D_3 * \cot\beta \quad (2)$$

wherein $D_5$ represents the distance to advance, $D_4$ represents a distance component between the projecting module and the first imaging module in the advance direction, and β represents the divergence angle of the projecting module; and in the advance direction, in the case that the projecting module is positioned between the first imaging module and the projection shade, the formula (2) is $D_5=D_1*\cos \alpha - D_4 - D_3*\cot \beta$, and in the case that the first imaging module is positioned between the projecting module and the projection shade, the formula (2) is $D_5=D_1*\cos \alpha + D_4 - D_3*\cot \beta$.

In some embodiments, the apparatus 90 further includes: a first identifying unit 9054, configured to identify whether the projection shade is positioned in the horizontal orientation of the projection picture in response to the distance to advance being greater than the movable distance in the advance direction; a second identifying unit 9055, configured to identify, based on the first image, whether another projection shade is present in a direction opposite to the projection shade in the horizontal orientation in response to the projection shade being positioned in the horizontal orientation of the projection picture; a second calculating unit 9056, configured to calculate a distance between the another projection shade and the projection picture in response to identifying that the another projection shade is present in the direction opposite to the projection shade in the horizontal orientation; a third calculating unit 9057, configured to calculate a distance from the projection shade to the optical axis of the projecting module based on a distance component between the projecting module and the first imaging module in the horizontal orientation, the spacing distance between the first imaging module and the projection shade, and the included angle between the connection line connecting the first imaging module and the projection shade and the central line; a fourth calculating unit 9058, configured to calculate a lateral movable distance desired by the projection device based on the distance from the projection shade to the optical axis of the projecting module; a second determining unit 9059, configured to determine whether the lateral movable distance is less than or equal to the distance between the another projection shade and the projection picture; and a second control unit 9060, configured to control, in response to the lateral movable distance being less than or equal to the distance between the another projection shade and the projection picture, the position adjusting module to move such that the projection device laterally moves towards a direction opposite to the projection shade by the lateral movable distance.

In the embodiments of the present disclosure, a first image, captured by the first imaging module, of a position where the projection picture is located, and a second image, captured by the second imaging module, of surroundings of the projection device are received by the receiving module; whether a projection shade is present within a projection range of the projecting module is identified by the first identifying module based on the first image; position information of the projection shade is identified by the second identifying module in response to the projection shade being present; movable directions of the projection device and movable distances of the projection device in the movable directions are identified by the third identifying module based on the second image; and the position adjusting module is controlled by the control module to adjust the projection device based on the position information of the projection shade and in combination with the movable directions of the projection device and the movable distances in the movable directions, such that the projection range of the projecting module escapes from the projection shade and a complete projection picture is acquired. By this method, a complete projection picture is acquired with no need of manually moving the projection device, and the operation is very convenient.

Figure 12:
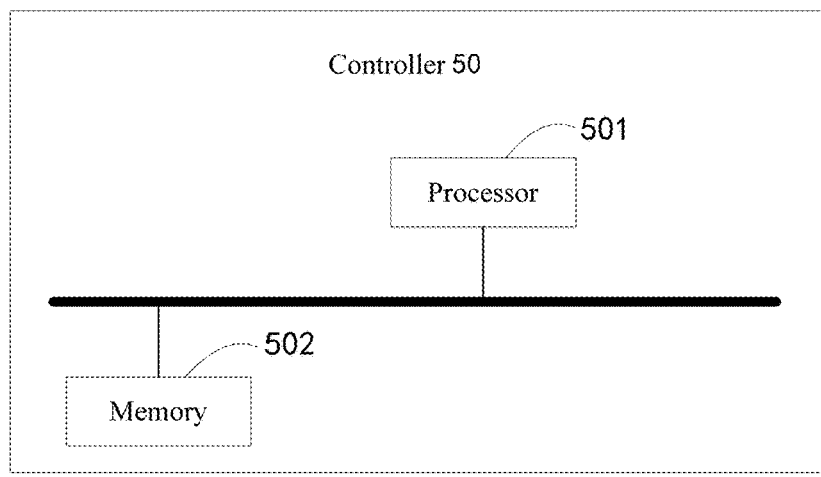
FIG. 12 is a schematic structural diagram illustrating hardware of a controller for performing the method for adjusting the projection picture according to an embodiment of the present disclosure.

Further, referring to FIG. 12, FIG. 12 is a schematic structural diagram illustrating hardware of a controller for performing the method for adjusting the projection picture according to an embodiment of the present disclosure. As illustrated in FIG. 12, the controller 50 includes one or more processors 501 and a memory 502, and FIG. 12 uses one processor as an example.

The processor 501 and the memory 502 may be connected via a bus or in another manner, and FIG. 12 uses the bus as an example.

The memory 502, as a non-volatile computer readable storage medium, may be configured to store non-volatile software programs, non-volatile computer executable programs and modules, for example, the program instructions/modules corresponding to the methods for adjusting the projection picture in the embodiments of the present disclosure (for example, the modules as illustrated in FIG. 11). The non-volatile software programs, instructions and modules stored in the memory 502, when executed, cause the processor 501 to perform various function applications and data processing of the apparatus for adjusting the projection picture, that is, performing the methods for adjusting the projection picture according to the above method embodiments.

The memory 502 may also include a program storage area and a data storage area. The program storage area may store an operating system and an application implementing at least one function. The data storage area may store data created according to use of the apparatus for adjusting the projection picture. In addition, the memory 502 may include a high-speed random-access memory, or include a non-volatile memory, for example, at least one disk storage device, a flash memory device, or another non-volatile solid storage device. In some embodiments, the memory 502 optionally includes memories remotely configured relative to the processor 501. These memories may be connected to the apparatus for adjusting the projection picture over a network. Examples of the above network include, but not limited to, the Internet, Intranet, local area network, mobile communication network and a combination thereof.

One or more modules are stored in the memory 502, and when executed by the at least one processor 501, perform the method for adjusting the projection picture in any of the above method embodiments. The product may perform the method according to the embodiments of the present disclosure, has corresponding function modules for performing the method, and achieves the corresponding beneficial effects. For technical details that are not illustrated in detail in this embodiment, reference may be made to the description of the methods according to the embodiments of the present disclosure.

An embodiment of the present disclosure provides a non-volatile computer-readable storage medium, wherein the non-volatile computer-readable storage medium stores one or more computer-executable instructions. The one or more computer-executable instructions, when executed by a controller, cause the controller to perform the method for adjusting the projection picture in any of the above method embodiments.

An embodiment of the present disclosure further provides a computer program product. The computer program product includes one or more computer programs stored in a non-volatile computer-readable storage medium. The one or more computer programs include one or more program instructions. The one or more program instructions, when executed by a computer, cause the computer to perform the method for adjusting the projection picture in any of the above embodiments.

The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. Part or all of the modules may be selected according to the actual needs to achieve the objectives of the technical solutions of the embodiments.

According to the above embodiments of the present disclosure, a person skilled in the art may clearly understand that the embodiments of the present disclosure may be implemented by means of hardware or by means of software plus a necessary general hardware platform. Persons of ordinary skill in the art may understand that all or part of the steps of the methods in the embodiments may be implemented by a program instructing relevant hardware. The program may be stored in a computer-readable storage medium. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

Described above are exemplary embodiments of the present disclosure, but are not intended to limit the scope of the present disclosure. Any equivalent structure or equivalent process variation made based on the specification and drawings of the present disclosure, which is directly or indirectly applied in other related technical fields, fall within the scope of the present disclosure.

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

What is claimed is:

1. A method for adjusting a projection picture, applicable to a projection device, the projection device comprising a projecting module, a first imaging module, a second imaging module, and a position adjusting module, wherein the projecting module, the first imaging module, and the second imaging module are all disposed in the position adjusting module, the projecting module is configured to project an image, and the position adjusting module is configured to adjust positions of the projecting module and the imaging module such that the projection picture is adjusted; wherein the method comprises:

receiving a first image, captured by the first imaging module, of a position where the projection picture is located, and a second image, captured by the second imaging module, of surroundings of the projection device;

identifying, based on the first image, whether a projection shade is present within a projection range of the projecting module;

identifying position information of the projection shade in response to the projection shade being present;

identifying, based on the second image, movable directions of the projection device and movable distances of the projection device in the movable directions; and controlling, based on the position information of the projection shade and in combination with the movable directions of the projection device and the movable distances in the movable directions, the position adjusting module to adjust the projection device, such that the projection range of the projecting module escapes from the projection shade and a complete projection picture is acquired.

2. The method according to claim 1, wherein the movable directions comprise an advance direction; and controlling, based on the position information of the projection shade and in combination with the movable directions of the projection device and the movable distances in the movable directions, the position adjusting module to adjust the projection device further comprises:

calculating, based on the position information of the projection shade, a distance to advance of the projection device, wherein the distance to advance is such a distance to advance that the projection range of the projection device is capable of escaping from the projection shade;

determining whether the distance to advance is less than or equal to a movable distance in an advance direction; and controlling the position adjusting module to move forward by the distance to advance in response to the distance to advance being less than or equal to the movable distance in the advance direction.

3. The method according to claim 2, wherein the position information comprises a spacing distance between the first imaging module and the projection shade, and an included angle between a connection line connecting the first imaging module and the projection shade and a central line, wherein the central line is parallel to an optical axis of the projecting module; and calculating, based on the position information of the projection shade, the distance to advance of the projection device further comprises:

identifying an orientation of the projection picture relative to the projection shade based on the first image, wherein the orientation comprises a vertical orientation and a horizontal orientation;

calculating a distance from the projection shade to the optical axis of the projecting module based on a distance component between the projecting module and the first imaging module in the orientation, the spacing distance between the first imaging module and the projection shade, and the included angle between the connection line connecting the first imaging module and the projection shade and the central line; and calculating the distance to advance based on a divergence angle of the projecting module and the distance from the projection shade to the optical axis of the projecting module.

4. The method according to claim 3, wherein the distance from the projection shade to the optical axis of the projecting module is calculated by using the following formula:

$$D_3 = D_1 * \sin\alpha \pm D_2 \quad (1)$$

wherein $D_3$ represents the distance from the projection shade to the optical axis of the projecting module, $D_1$ represents the spacing distance between the first imaging module and the projection shade, and $\alpha$ represents the included angle between the connection line connecting the first imaging module and the projection shade and the central line, $D_2$ represents the distance component between the projecting module and the first imaging module in the orientation; and in the orientation, in the case that the projecting module is positioned between the first imaging module and the projection shade, the formula (1) is $D_3=D_1*\sin\alpha-D_2$, and in the case that the first imaging module is positioned between the projecting module and the projection shade, the formula (1) is $D_3=D_1*\sin\alpha+D_2$.

5. The method according to claim 4, wherein the distance to advance is calculated by using the following formula:

$$D_5 = D_1 * \cos\alpha \pm D_4 - D_3 * \cot\beta \quad (2)$$

wherein $D_5$ represents the distance to advance, $D_4$ represents a distance component between the projecting module and the first imaging module in the advance direction, and $\beta$ represents the divergence angle of the projecting module; and in the advance direction, in the case that the projecting module is positioned between the first imaging module and the projection shade, the formula (2) is $D_5=D_1*\cos\alpha-D_4-D_3*\cot\beta$, and in the case that the first imaging module is positioned between the projecting module and the projection shade, the formula (2) is $D_5=D_1*\cos\alpha+D_4-D_3*\cot\beta$.

6. The method according to claim 3, further comprising:
identifying whether the projection shade is positioned in the horizontal orientation of the projection picture in response to the distance to advance being greater than the movable distance in the advance direction;
identifying, based on the first image, whether another projection shade is present in a direction opposite to the projection shade in the horizontal orientation in response to the projection shade being positioned in the horizontal orientation of the projection picture;
calculating a distance between the another projection shade and the projection picture in response to identifying that the another projection shade is present;
calculating a distance from the projection shade to the optical axis of the projecting module based on a distance component between the projecting module and the first imaging module in the horizontal orientation, the spacing distance between the first imaging module and the projection shade, and the included angle between the connection line connecting the first imaging module and the projection shade and the central line; and
calculating a lateral movable distance desired by the projection device based on the distance from the projection shade to the optical axis of the projecting module;
determining whether the lateral movable distance is less than or equal to the distance between the another projection shade and the projection picture; and
controlling, in response to the lateral movable distance being less than or equal to the distance between the another projection shade and the projection picture, the position adjusting module to move such that the projection device laterally moves towards a direction opposite to the projection shade by the lateral movable distance.

7. An apparatus for adjusting a projection picture, applicable to a projection device, the projection device comprising a projecting module, a first imaging module, a second imaging module, and a position adjusting module, wherein the projecting module, the first imaging module, and the second imaging module are all disposed in the position adjusting module, the projecting module is configured to project an image, and the position adjusting module is configured to adjust positions of the projecting module and the imaging module such that the projection picture is adjusted; wherein the apparatus comprises:
a receiving module, configured to receive a first image, captured by the first imaging module, of a position where the projection picture is located, and a second image, captured by the second imaging module, of surroundings of the projection device;
a first identifying module, configured to identify, based on the first image, whether a projection shade is present within a projection range of the projecting module;
a second identifying module, configured to identify position information of the projection shade in response to the projection shade being present within the projection range of the projecting module;
a third identifying module, configured to identify, based on the second image, movable directions of the projection device and movable distances of the projection device in the movable directions; and
a control module, configured to control, based on the position information of the projection shade and in combination with the movable directions of the projection device and the movable distances in the movable directions, the position adjusting module to adjust the projection device, such that the projection range of the projecting module escapes from the projection shade and a complete projection picture is acquired.

8. The apparatus according to claim 7, wherein the movable directions comprise an advance direction; and
the control module comprises:
a first calculating unit, configured to calculate, based on the position information of the projection shade, a distance to advance of the projection device, wherein the distance to advance is such a distance to advance that the projection range of the projection device is capable of escaping from the projection shade;
a first determining unit, configured to determine whether the distance to advance is less than or equal to a movable distance in an advance direction; and
a first control unit, configured to control the position adjusting module to move forward by the distance to advance in response to the distance to advance being less than or equal to the movable distance in the advance direction.

9. The apparatus according to claim 8, wherein the position information comprises a spacing distance between the first imaging module and the projection shade, and an included angle between a connection line connecting the first imaging module and the projection shade and a central line, wherein the central line is parallel to an optical axis of the projecting module; and the calculating unit is specifically configured to:

identify an orientation of the projection picture relative to the projection shade based on the first image, wherein the orientation comprises a vertical orientation and a horizontal orientation;

calculate a distance from the projection shade to the optical axis of the projecting module based on a distance component between the projecting module and the first imaging module in the orientation, the spacing distance between the first imaging module and the projection shade, and the included angle between the connection line connecting the first imaging module and the projection shade and the central line; and calculate the distance to advance based on a divergence angle of the projecting module and the distance from the projection shade to the optical axis of the projecting module.

10. A projection device, comprising:

a projecting module, configured to project an image;

a first imaging module, configured to capture a first image of a position where a projection picture is located;

a second imaging module, configured to capture a second image of surroundings of the projection device;

a position adjusting module, wherein the projecting module, the first imaging module, and the second imaging module are all disposed in the position adjusting module, and the position adjusting module is configured to adjust positions of the projecting module and the imaging module such that the projection picture is adjusted; and a controller, comprising at least one processor and a memory, wherein the at least one processor is connected to the projecting module, the first imaging module, the second imaging module, and the position adjusting module, the memory stores one or more instructions executable by the at least one processor, and the at least one processor, when executing the one or more instructions, is caused to perform a method for adjusting a projection picture, wherein the method comprises:

receiving a first image, captured by the first imaging module, of a position where the projection picture is located, and a second image, captured by the second imaging module, of surroundings of the projection device;

identifying, based on the first image, whether a projection shade is present within a projection range of the projecting module;

identifying position information of the projection shade in response to the projection shade being present;

identifying, based on the second image, movable directions of the projection device and movable distances of the projection device in the movable directions; and controlling, based on the position information of the projection shade and in combination with the movable directions of the projection device and the movable distances in the movable directions, the position adjusting module to adjust the projection device, such that the projection range of the projecting module escapes from the projection shade and a complete projection picture is acquired.

11. The projection device according to claim 10, wherein the movable directions comprise an advance direction; and controlling, based on the position information of the projection shade and in combination with the movable directions of the projection device and the movable distances in the movable directions, the position adjusting module to adjust the projection device further comprises:

calculating, based on the position information of the projection shade, a distance to advance of the projection device, wherein the distance to advance is such a distance to advance that the projection range of the projection device is capable of escaping from the projection shade;

determining whether the distance to advance is less than or equal to a movable distance in an advance direction; and controlling the position adjusting module to move forward by the distance to advance in response to the distance to advance being less than or equal to the movable distance in the advance direction.

12. The projection device according to claim 11, wherein the position information comprises a spacing distance between the first imaging module and the projection shade, and an included angle between a connection line connecting the first imaging module and the projection shade and a central line, wherein the central line is parallel to an optical axis of the projecting module; and calculating, based on the position information of the projection shade, the distance to advance of the projection device further comprises:

identifying an orientation of the projection picture relative to the projection shade based on the first image, wherein the orientation comprises a vertical orientation and a horizontal orientation;

calculating a distance from the projection shade to the optical axis of the projecting module based on a distance component between the projecting module and the first imaging module in the orientation, the spacing distance between the first imaging module and the projection shade, and the included angle between the connection line connecting the first imaging module and the projection shade and the central line; and calculating the distance to advance based on a divergence angle of the projecting module and the distance from the projection shade to the optical axis of the projecting module.

13. The projection device according to claim 12, wherein the distance from the projection shade to the optical axis of the projecting module is calculated by using the following formula:

$$D_3 = D_1 * \sin\alpha \pm D_2 \quad (1)$$

wherein $D_3$ represents the distance from the projection shade to the optical axis of the projecting module, $D_1$ represents the spacing distance between the first imaging module and the projection shade, and $\alpha$ represents the included angle between the connection line connecting the first imaging module and the projection shade and the central line, $D_2$ represents the distance component between the projecting module and the first imaging module in the orientation; and in the orientation, in the case that the projecting module is positioned between the first imaging module and the projection shade, the formula (1) is $D_3=D_1*\sin \alpha - D_2$, and in the case that the first imaging module is positioned between the projecting module and the projection shade, the formula (1) is $D_3=D_1*\sin \alpha + D_2$.

14. The projection device according to claim 13, wherein the distance to advance is calculated by using the following formula:

$$D_5 = D_1 * \cos\alpha \pm D_4 - D_3 * \cot\beta \qquad (2)$$

wherein $D_5$ represents the distance to advance, $D_4$ represents a distance component between the projecting module and the first imaging module in the advance direction, and $\beta$ represents the divergence angle of the projecting module; and in the advance direction, in the case that the projecting module is positioned between the first imaging module and the projection shade, the formula (2) is $D_5=D_1*\cos \alpha - D_4 - D_3 * \cot \beta$, and in the case that the first imaging module is positioned between the projecting module and the projection shade, the formula (2) is $D_5=D_1*\cos \alpha + D_4 - D_3 * \cot \beta$.

15. The projection device according to claim 12, the method further comprising:

identifying whether the projection shade is positioned in the horizontal orientation of the projection picture in response to the distance to advance being greater than the movable distance in the advance direction;

identifying, based on the first image, whether another projection shade is present in a direction opposite to the projection shade in the horizontal orientation in response to the projection shade being positioned in the horizontal orientation of the projection picture;

calculating a distance between the another projection shade and the projection picture in response to identifying that the another projection shade is present;

calculating a distance from the projection shade to the optical axis of the projecting module based on a distance component between the projecting module and the first imaging module in the horizontal orientation, the spacing distance between the first imaging module and the projection shade, and the included angle between the connection line connecting the first imaging module and the projection shade and the central line; and calculating a lateral movable distance desired by the projection device based on the distance from the projection shade to the optical axis of the projecting module;

determining whether the lateral movable distance is less than or equal to the distance between the another projection shade and the projection picture; and controlling, in response to the lateral movable distance being less than or equal to the distance between the another projection shade and the projection picture, the position adjusting module to move such that the projection device laterally moves towards a direction opposite to the projection shade by the lateral movable distance.

* * * * *